United States Patent
Haney

[11] Patent Number: 6,123,844
[45] Date of Patent: *Sep. 26, 2000

[54] WATER TREATMENT APPARATUS

[75] Inventor: Harold E. Haney, San Patricio Garza Garcia, Mexico

[73] Assignee: ATP International, Ltd., Nassau, Bahamas

[*] Notice: This patent is subject to a terminal disclaimer.

[21] Appl. No.: 09/134,535

[22] Filed: Aug. 14, 1998

Related U.S. Application Data

[63] Continuation of application No. 08/655,774, May 31, 1996, Pat. No. 5,795,476.

[51] Int. Cl.⁷ .................................................. B01D 63/00
[52] U.S. Cl. ...................... 210/257.1; 210/97; 210/104; 210/108; 210/134; 210/137; 210/321.6; 210/416.1; 210/257.2
[58] Field of Search .................... 210/195.1, 195.2, 210/257.2, 257.1, 97, 104, 134, 137, 108, 321.6; 220/6, 476, 477, 416.1

[56] References Cited

U.S. PATENT DOCUMENTS

| | | |
|---|---|---|
| 2,785,806 | 3/1957 | Brown et al. . |
| 4,071,453 | 1/1978 | Koslowski . |
| 4,176,063 | 11/1979 | Tyler . |
| 4,744,895 | 5/1988 | Gales et al. . |
| 5,131,277 | 7/1992 | Birdsong et al. . |
| 5,139,678 | 8/1992 | Frederick, Jr. et al. . |
| 5,296,148 | 3/1994 | Colangelo ............................ 210/257.2 |
| 5,399,263 | 3/1995 | Chomka et al. . |
| 5,484,529 | 1/1996 | Malugade et al. . |
| 5,500,113 | 3/1996 | Hartley et al. . |
| 5,795,476 | 8/1998 | Haney ................................. 210/257.1 |

*Primary Examiner*—Ana Fortuna
*Attorney, Agent, or Firm*—Thompson & Knight L.L.P.

[57] ABSTRACT

An apparatus for treatment of water for consumption comprises a main storage tank, a pump, a treatment reactor and a valve for controlling the flow of water from the inlet pump to the treatment reactor and from the reactor to a flush discharge and to a waste water discharge. The tank is basically cylindrical with two part cylindrical recesses parallel to the axis of the tank and lying along one side of the tank. Each recess receives a respective one of the cylindrical pump body and the cylindrical reactor body. The pump and reactor are therefore efficiently stored within the cylindrical surface of the main tank.

17 Claims, 8 Drawing Sheets

WATER TREATMENT APPARATUS

This application is a continuation of application Ser. No. 08/655,774 filed May 31, 1996 and now issued as U.S. Pat. No. 5,795,476.

BACKGROUND OF THE INVENTION

This invention relates to a water treatment apparatus of the type including a pump for directing inlet water through the apparatus, a storage tank for receiving treated water, a treatment reactor through which the water is directed to separate treated water from waste water containing contaminants and a valve for controlling the supply of water to and from the treatment reactor in normal flow conditions and flush conditions.

Apparatus of this type has been developed and on sale for many years and many different devices are currently available and have been previously made available by the present applicant.

However it is always desirable to provide improvements to such apparatus to improve the efficiency and simplicity of the construction for purposes of cost savings and more reliability.

SUMMARY OF THE INVENTION

It is one object of the present invention, to provide an improved apparatus of this general type in which the tank provides suitable mounting areas for the pump and reactor.

According to one aspect of the invention there is provided an apparatus for treating water from a water supply for consumption comprising:

a water supply inlet;

a treatment reactor having a housing which is elongate along an axis of the reactor with a first port, a second port, and a third port in the housing, said treatment reactor being arranged for receiving water from the water supply inlet at one of the first and third ports and for separating water from the water supply inlet into a consumption output at the second port and a waste output at the other of the first and third ports;

a pump having a pump body which is elongate along an axis of the pump for pumping water through the reactor;

a storage tank for receiving and storing water from the consumption output;

and a valve arrangement for controlling flow of the water through the reactor;

the storage tank having a tank wall defining a tank wall contour surrounding a tank axis;

the tank wall having at least one recess in the tank wall defined by a recess wall portion recessed from the tank wall contour toward the tank axis;

the recess wall portion at least partly surrounding a recess axis of the recess which is parallel to the tank axis;

the at least one recess receiving at least partly therein at least one of the body of the pump and the housing of the reactor;

said at least one of the pump and treatment reactor therefore being separated from water stored within the storage tank by the storage tank wall.

Preferably both the pump and the reactor are separated from water stored within the storage tank by the storage tank wall.

Preferably the at least one recess comprises a first recess and a second recess, the recesses being angularly spaced around the tank wall contour relative to the tank axis and each having a respective axis with the axes being mutually parallel and parallel to the tank axis, the first recess receiving at least partly the body of the pump with the axis of the pump parallel to the tank axis and the second recess receiving at least partly the housing of the treatment reactor with the axis of the reactor parallel to the tank axis.

Preferably the tank wall contour is cylindrical.

Preferably the cylindrical tank wall contour is circular in cross-section at right angles to the tank axis.

Preferably the pump body and the reactor housing are wholly contained within the respective recess and therefore within the tank wall contour.

Preferably there is provided a removable cover panel arranged to extend across the recesses thereby enclosing the recesses.

Preferably the removable cover panel follows the tank wall contour.

Preferably a wall portion joining the first and second recesses is recessed from the tank wall contour.

Preferably the wall portion joining the first and second recesses defines an area is arranged for receiving plumbing and wiring connections to the reactor and the pump.

Preferably the recesses extend substantially continuously from the position closely adjacent one end of the tank to a position closely adjacent an opposed end of the tank.

Preferably the tank has the axis thereof vertical such that said one end is at the top and the opposed end is at the bottom.

Preferably the recesses extend to a position spaced from the top.

Preferably there is provided at least one support strap for the body of the pump and the housing of the reactor, the strap being attached to the wall portion and including portions each extending outwardly to a respective side of the wall portion for engaging around the body of the pump and the housing of the reactor.

Preferably one of the recesses is larger than the other of the recesses.

Preferably a top of the tank includes a shallow cylindrical receptacle for the valve arrangement, an electric control circuit, and an actuator for controlling the valve arrangement.

Preferably there is provided a removable cover panel having a surrounding flange for engaging over the top of the tank for enclosing the receptacle.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
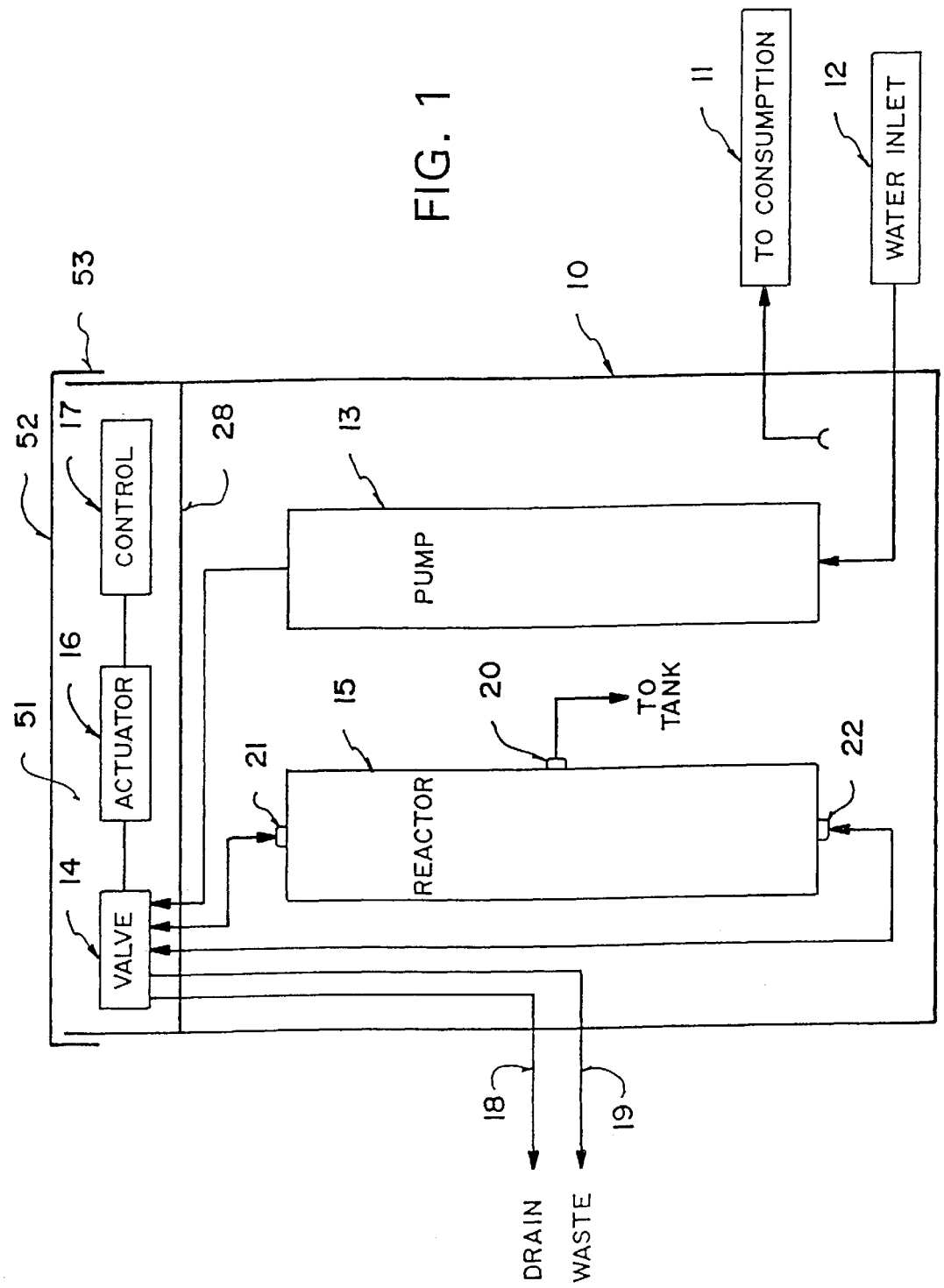
FIG. 1 is a schematic illustration of the elements of a water treatment apparatus according to the present invention.

The apparatus of the present invention comprises a main consumption water storage tank 10 which provides a main structure for the apparatus and contains the water for supply to a consumption system schematically indicated at 11. The apparatus further includes an inlet water supply connection generally indicated at 12 which is connected to a suitable supply of an inlet water to be treated.

The apparatus further includes a pump 13 for generating pressure at a required level in the system and for generating pressure in the line to the consumption system 11. A valve 14 receives water from the pump and controls supply of that water to and from a reactor 15 which acts to treat the water. The valve is actuated by an actuator 16 controlled by an electrical control circuit 17 to provide the functions hereinafter described. The valve includes a discharge line 18 for discharge of flush water and flushed materials to drain and the second outlet line 19 for discharge of waste water.

The treatment reactor 15 can be of the reverse osmosis type which receives water at an inlet port and separates that water into consumption water for discharge at a discharge port to the tank indicated at 20. The reverse osmosis system, as is well known in the prior art, includes a membrane over which the water passes so that the consumption water is separated from the supply water by passing through the membrane to form a waste water stream carrying an increased proportion of contaminants. The waste water stream is discharged at a second port of the reactor for return to the valve 14.

The treatment reactor 15 thus includes a first port 21, a second port 22 together with the third port 20 which discharges consumption water to the tank. The treatment reactor is arranged so that water can pass either in a forward flow direction, in which water is input at the port 21 and is discharged at port 22, or in a reverse flow direction in which the water is input at the port 22 and the waste water is discharged at the port 21.

The treatment reactor also requires to be flushed on occasion to extract contaminants collecting within the reactor and this flushing action is carried out, as explained hereinafter, in both directions of flow so that the flushed water contaminants can be discharged initially at the port 21 and then by reversing the flushing direction can be discharged at the port 22 or vice versa.

The waste water discharged from the treatment reactor during the normal operating condition is discharged at the line 19 and this can be reused for example by return to a well or can be used as grey water for washing and the like. The flush water discharged from the treatment reactor during the flushing cycles is discharged from the line 18 from the valve to drain and this flush water is normally discharged to a sewage collection system as it is too filled with contaminants for further use.

Figure 2:
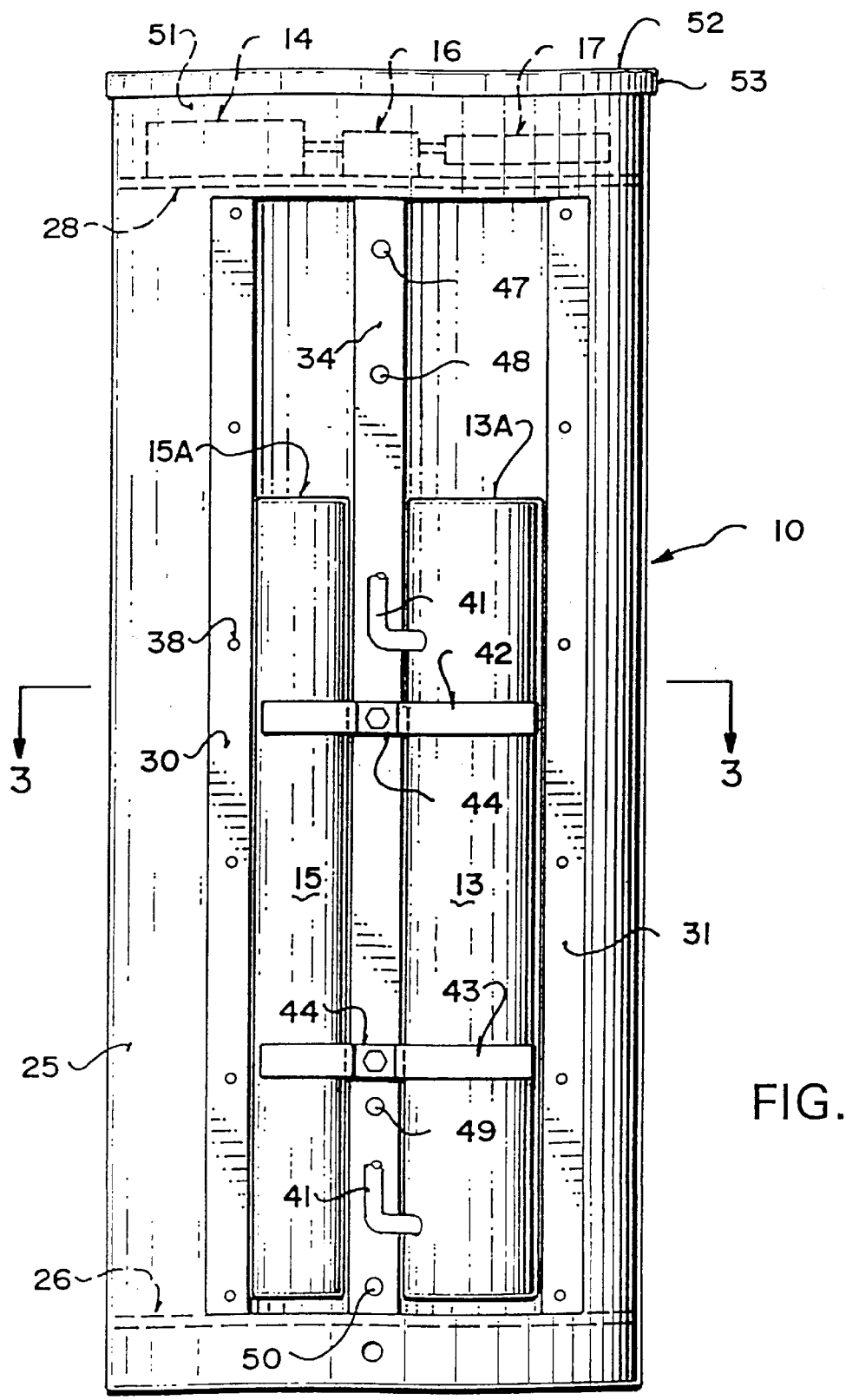
FIG. 2 is a front elevational view of the apparatus of FIG. 1 showing the mounting of the various elements of the apparatus on the tank structure.
Figure 3:
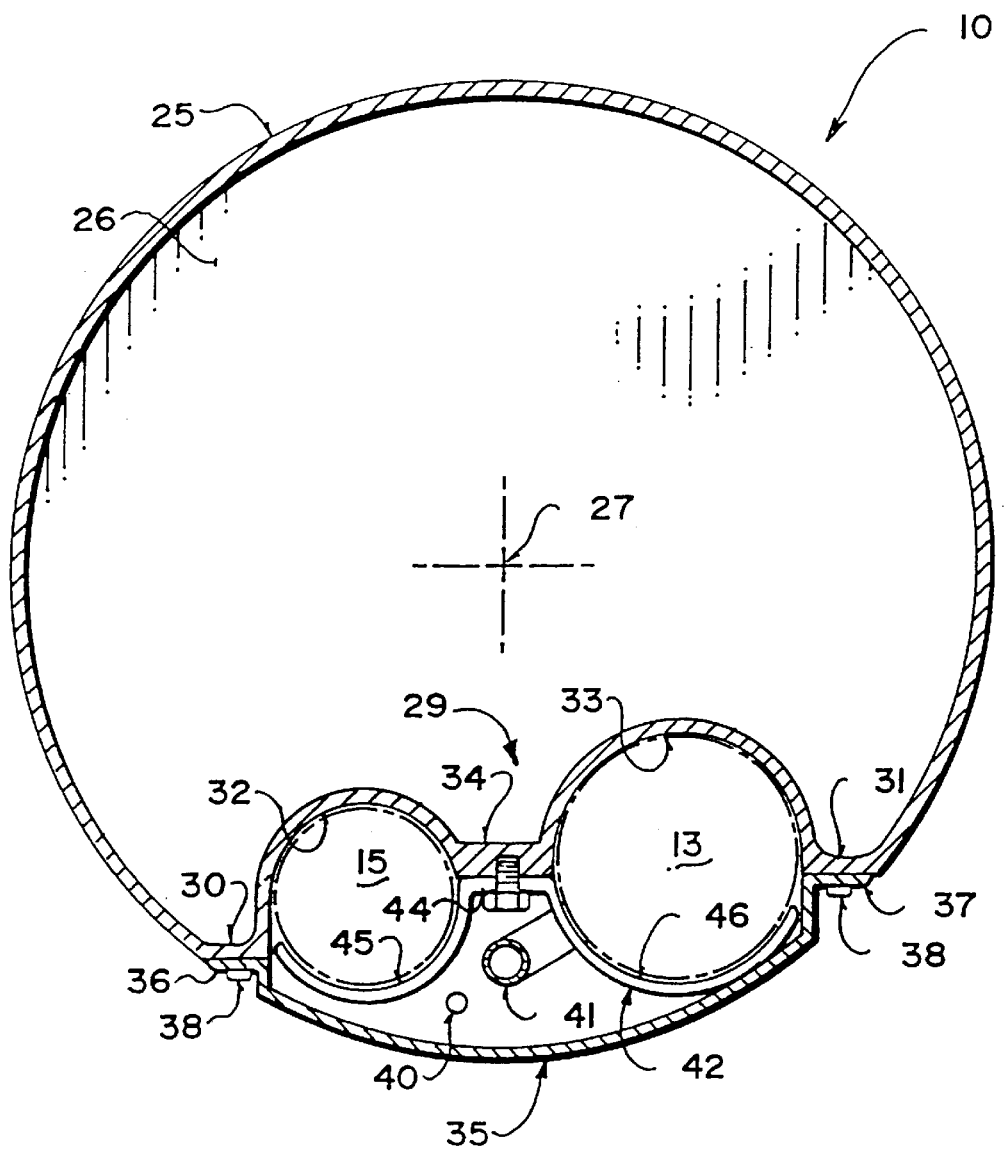
FIG. 3 is a cross sectional view along the lines 3—3 of FIG. 2.

Turning now to FIGS. 2 and 3, the construction of the tank 10, which comprises a tank wall 25 with a vertical central axis 27. The tank is closed at a bottom end by a horizontal bottom wall 26 at an upper end by a horizontal top wall 28. The tank is thus substantially cylindrical in shape of circular cross section as best shown in FIG. 3. The tank wall therefore defines generally a tank contour which in the embodiment shown is preferably cylindrical and preferably of circular cross-section.

The tank wall 25 is however modified by the addition of a recess section generally indicated at 29. The recess section as shown in FIG. 3 in cross section includes two inturned portions 30 and 31 which lie on two separate cords of the circle. Each of the inturned sections connects to a respective one of two part cylindrical portions 32 and 33 which extend around approximately 180° of arc. The radius of curvature and therefore the diameter of the part cylindrical portion 23 is larger than that of the part cylindrical portion 32. The portions 32 and 33 are connected by a vertical band 34 which lies on the same cord as the inturned portion 31. The recesses are therefore recessed away from the normal contour of the tank toward the axis of the tank.

The recess portions 32 and 33 extend substantially along the full length of the tank from the top wall 28 to the bottom wall 26. Each of the recess portions receives a respective one of the pump 13 and the treatment reactor 15 which are placed in the respective recess with the bottom end of the respective element sitting on a bottom end of the recess at or adjacent the bottom plate 26. The top end of the pump is indicated at 13A and the top end of the reactor is indicated at 15A. The recesses are therefore manufactured of a length which is greater than the maximum size of the pump and reactor to be used so as to accommodate different sizes of these elements. The pump 13 is housed within a cylindrical housing having an outside surface matching substantially the inside surface of the portion 33. Similarly the treatment reactor is housed in a cylindrical housing again having an outside surface matching the diameter or radius of the recess 32. The pump has therefore a pump body which is elongate with an axis along the recess and therefore parallel to the tank axis. The reactor has therefore a reactor housing which is elongate with an axis along the recess and therefore parallel to the tank axis.

The recesses are arranged such that the cylindrical body of the pump and of the reactor is wholly contained within the imaginary cylinder defined by the tank wall 25. The recess area 29 is covered by a cover plate 35 which is removed in the view shown in FIG. 2. The cover plate 35 is shaped as a part cylindrical element following the imaginary cylinder of the tank wall 25 so that when in place the cover 35 and the tank form the substantially complete cylinder. Edges of the cover 35 are recessed as indicated at 36 and 37 so as to lie flat against the inturned portions 30 and 31 respectively to which the recess portions 36 and 37 are attached by fasteners 38. The space between the central band 34 and the cover 35 is provided for receiving electrical connections 40 and plumbing connections 41. The pump and reactor are clamped into place by a pair of straps 42 and 43 each of which includes a central strap portion 44 of a width equal to the central band 34 and two part circular elements for wrapping around the front exposed portions of the pump and reactor respectively as indicated at 45 and 46. The central band 34 is relatively narrow in comparison with the recesses so as to reduce the extension of the recesses into the interior of the tank to a minimum so that the reactor and pump are just housed underneath the cover 35.

The central band 34 also provides a mounting for level detection elements 47, 48, 49 and 50 which detect various levels of water within the tank so as to control operation of the electrical circuit 17 as briefly described hereinafter.

Above the top plate 28 is provided a compartment 51 which is a shallow cylinder covered by a top plate 52 which is circular with a depending flange 53. This cylindrical receptacle houses the valve 14, the actuator 16 and the control circuit 17. The shaping of the tank with the recesses as described above, therefore, provides a mounting of the apparatus which is attractive in appearance and allows all the elements to be mounted on one structure so that they are properly and safely housed without separate elements in different locations.

Figure 4:
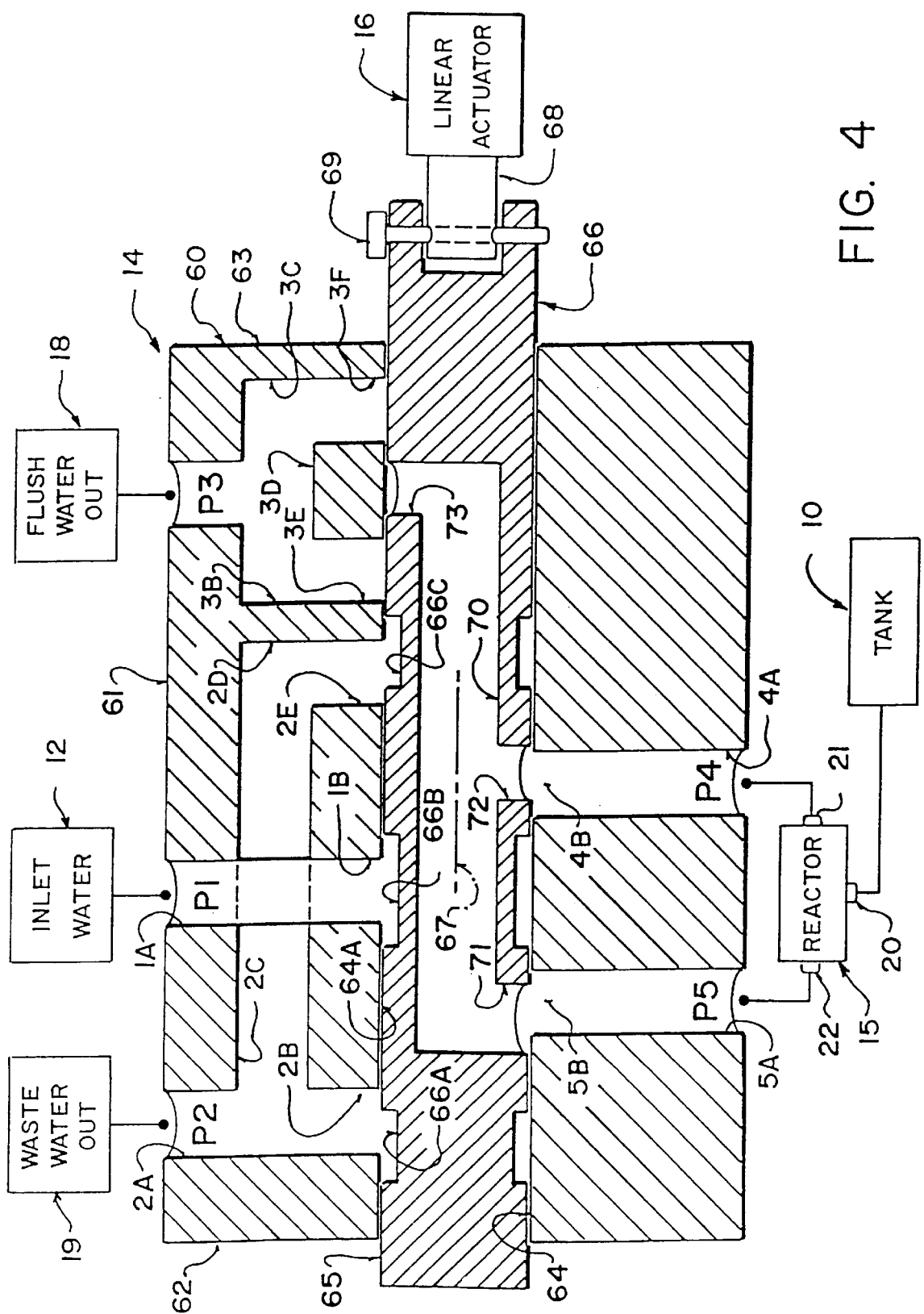
FIG. 4 is a vertical cross sectional view through the valve of FIG. 1 showing the connection of the valve to the various elements with the valve member of the valve being positioned so as to provide a closed centre position.

Turning now to FIG. 4 there is shown the construction of the valve 14 which includes a valve body 60 which is generally cylindrical in outside surface 61 with end faces 62 and 63. Along a central axis of the valve body is provided a valve bore 64 which is itself cylindrical and cooperates with a cylindrical outer surface 65 of a sliding valve member 66. The valve member is connected to the actuator 16 which is a linear actuator driving axial movement of the valve member 66 along the central axis 67 of the valve body. The valve member is maintained fixed against angular rotation and is moved axially in steps to a number of different positions described hereinafter. The linear actuator includes an actuating arm 68 which is connected to a free end of the valve member 66 by a vertical pin 69.

The valve body 60 includes a number of ports for connection to the various elements previously described. Thus the valve body includes a port 1 for connection to the inlet water from the pump 13. The valve body includes a port 2 for connection to the waste disposal line 19. The valve body includes a port 3 for connection to the flush water discharge line 18. The valve body includes a port 4 for connection to one side of the reactor 15 at port 21 of the reactor. The valve body includes a port 5 for connection to the other side of the reactor at port 22 of the reactor.

Each of the ports includes a respective channel which extends from the port radially inwardly of the valve body to a respective opening at the bore 64. Thus the port 1 includes a channel 1A connecting to an opening 1B in the bore 64. The port 2 includes a bore 2A which extends to an opening 2B at the bore. In addition the port 2 connects through a second bore 2C which is parallel to the axis 67 to a second radial bore 2D extending to a second opening 2E in the bore 64. Thus the openings 2B and 2E are axially spaced and are approximately equidistantly spaced on either side of the opening 1B.

The port 3 is also divided into two separate bores 3B and 3C by an axial bore portion 3D. The bore 3B connects to an opening 3E and the bore 3E connects to an opening 3F. Again the openings 3E and 3F are axially spaced but these are arranged beyond the opening 2E so as to be separate therefrom. The openings 2B, 1B, 2E, 3E and 3F all lie on a common line of the bore 64.

The port 5 includes a bore 5A extending radially inwardly to an opening 5B. Similarly the port 4 includes a bore 4A extending radially inwardly to an opening 4B at the bore 64. The openings 5B and 4B lie on a line of the bore which is spaced 180° around the bore relative to the axis 67. The openings 5B and 4B are arranged so that they are axially spaced from the openings 2B, 1B and 2E. Thus the opening 5B is opposite to a land portion 64A of the bore and the opening 4B is opposite to a land portion 64B of the bore. All of the openings 2B, 1B, 2E, 3E and 3F are opposite to land portions of the bore.

The valve member 66 has a generally cylindrical outer surface 65 which is a sliding fit within the bore 64 so that fluid is prevented from communicating along the surface of the valve member. However the valve member includes three annular recess portions 66A, 66B and 66C. These are axially spaced along the length of the valve member and are arranged for cooperation between the various openings to provide communications as described hereinafter.

The valve member includes an axial channel 70 extending along a part of the length of the valve member. The channel 70 communicates with openings 71 and 72 which are positioned on the side of the valve member for cooperation with the openings 5B and 4B. The channel further includes an opening 73 which is on the side of the valve member for cooperation with the openings 3E and 3F.

The openings 71 and 72 are arranged on opposite sides of the annular channel 66B. The opening 73 is arranged beyond the annular channel 66C.

The valve member is movable in steps through the five different positions shown in FIGS. 4 through 8. The position shown in FIG. 4 is a centre position with the positions of FIGS. 5 and 6 on one side and the positions of FIGS. 7 and 8 on the opposite side.

The position of FIG. 4 is a closed position. In this position the recess 66B of the valve member is aligned with the opening 1B but is also aligned with a land portion on the opposite side of the bore 64 so that the recess 66B is closed off from communication of inlet water to any of the openings. Similarly the opening 2B of the port 2 communicates with the recess 66A which is again aligned with a land portion on the opposite side of the bore so that the port 2 is closed off from communication with any of the other openings. Yet further, the openings 3E and 3F are aligned with land portions of the valve member 64 so that the port 3 is closed off from communication with any of the other openings. Thus the inlet water is closed off against flow through the valve and also the flush outlet 18 and the flush outlet 19 are closed by the valve against possible back flow.

Figure 5:
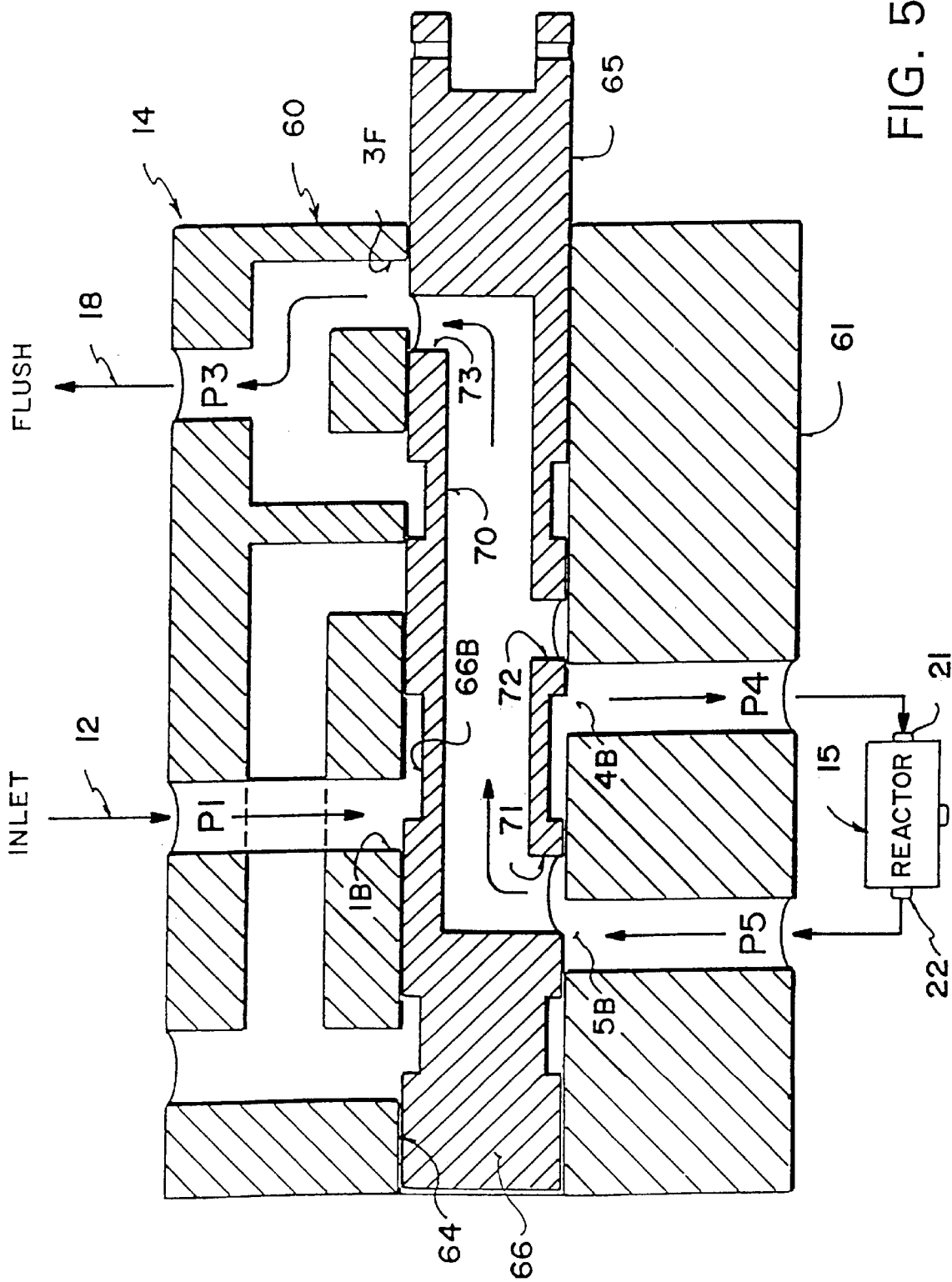
FIG. 5 is the same cross section of that of FIG. 4 showing the valve in a flush position in number 1.

In the position number 1 shown in FIG. 5, the valve is moved one step to the right. This acts to move the recess 66B so that it is aligned both with the opening 1B and the opening 4B thus allowing communication of inlet water from the port 1 to the port 4. Thus the inlet water is directed to the port 21 of the reactor so that waste water is discharged from the port 22 of the reactor. The waste water 22 is thus supplied to the port 5 which is communicated to the opening 5B. The opening 5B is aligned partially with the opening 71 thus communicating the waste water from the port 5B into the channel 70. The opening 73 of the channel is aligned partially with the opening 3F of the port 3 thus causing flush water to pass from the port 5 to the discharge port 3 and the line 18.

Thus movement from the central closed position to the first position provides a first flush action in which the reactor is flushed with inlet water from the port 1 with the flush water containing the contaminants being discharged through port 3.

Figure 6:
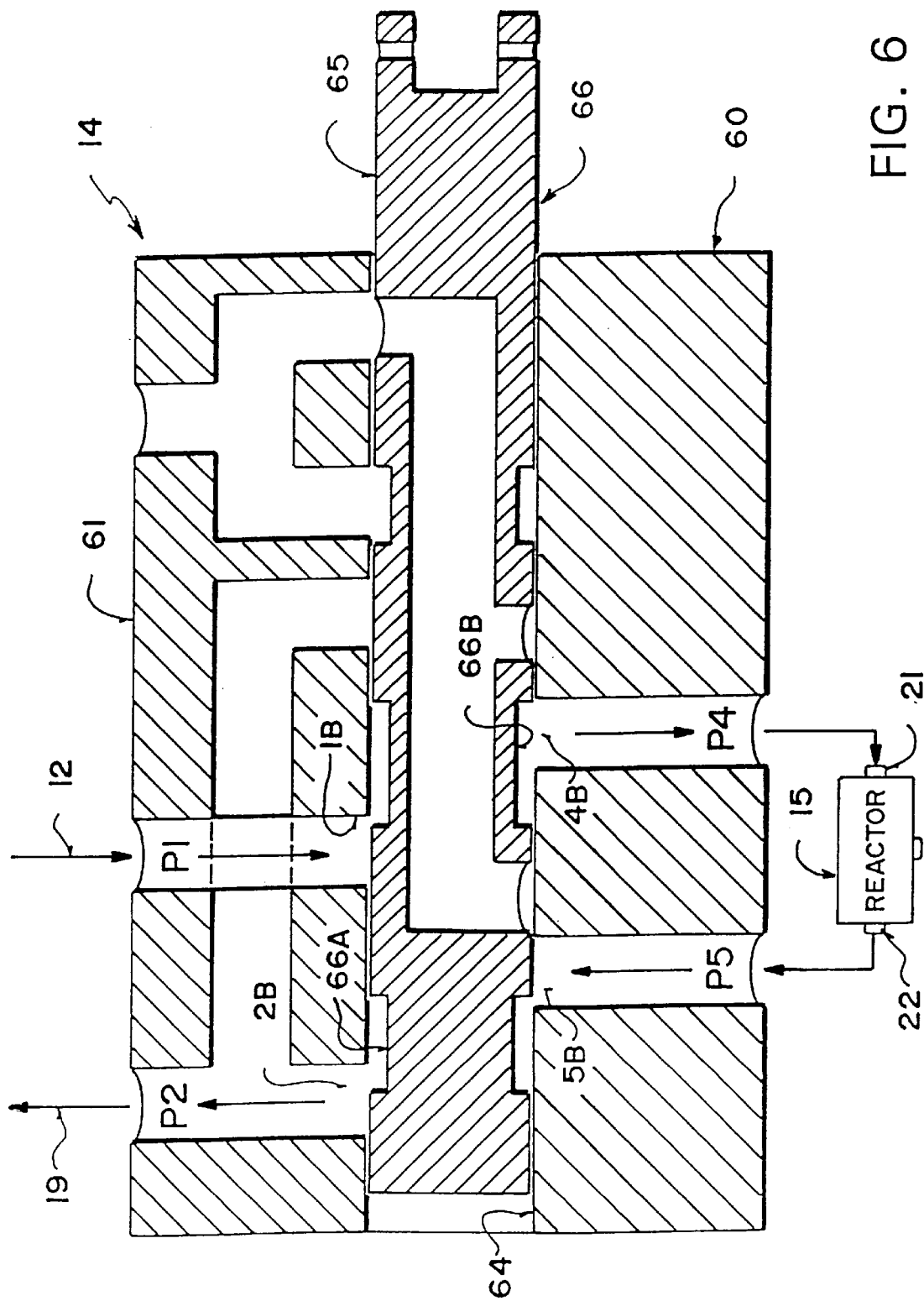
FIG. 6 is the same cross section as FIG. 4 showing the valve in a forward flow position number 2.

In FIG. 6 the valve member 64 is moved in a second step to a second position to the right of the first position shown in FIG. 5. In this position the opening 71 is moved beyond the opening 5B so that it is aligned with the land on the side of the opening 5B preventing further communication through the channel 70. The recess 66B remains partially aligned with the opening 1B and with the opening 4B thus allowing communication between the port 1 and the port 4. The opening 5B of the port 5 is aligned with the recess 66A which is also partially aligned with the opening 2B of the port 2. Thus the direction of water flow provides water from the inlet at port 1 passing to the port 4 and therefore to the port 21 of the reactor with waste water from the reactor discharging at port 22 to port 5 of the valve and thus to port 2 of the valve for discharge along the line 19.

The position in FIG. 6 therefore shows a first forward flow position in which the treatment cycle is operating to generate waste water and consumption water from the port 20.

Figure 7:
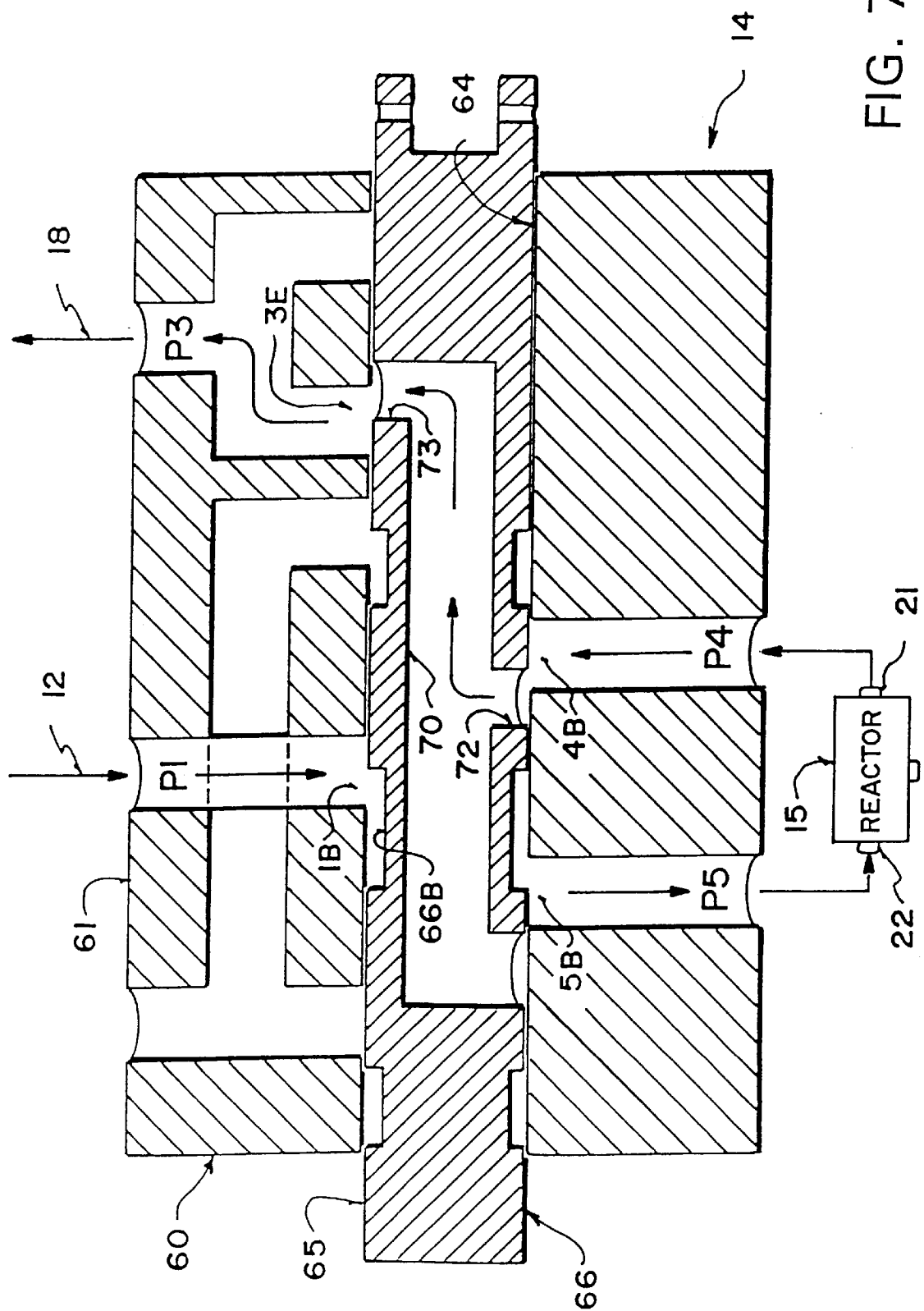
FIG. 7 is the same cross section as FIG. 4 showing the valve in a flush position number 3.

From the forward flow position shown in FIG. 6, the actuator 16 effects three steps of movement to the position shown in FIG. 7. In this position the recess 66B is partly aligned with the opening 1B of the port 1 and partly aligned with the opening 5B of the port 5. This causes inlet water to flow to the port 5 and therefore to the port 22 of the reactor. Water discharge from the port 21 of the reactor is therefore communicated to the port 4 of the valve. The opening 4B of the port 4 is partly aligned with the opening 72 of the channel 70 thus communicating the flush water from the reactor into the channel 70. The opening 73 of the channel is partly aligned with the opening 3E of the port 3 so that the flush water is discharged to the port 3 and thus to the discharge line 18.

The position shown in FIG. 7, therefore, provides a second flush position which is in effect reverse to the first flush position shown in FIG. 5.

Figure 8:
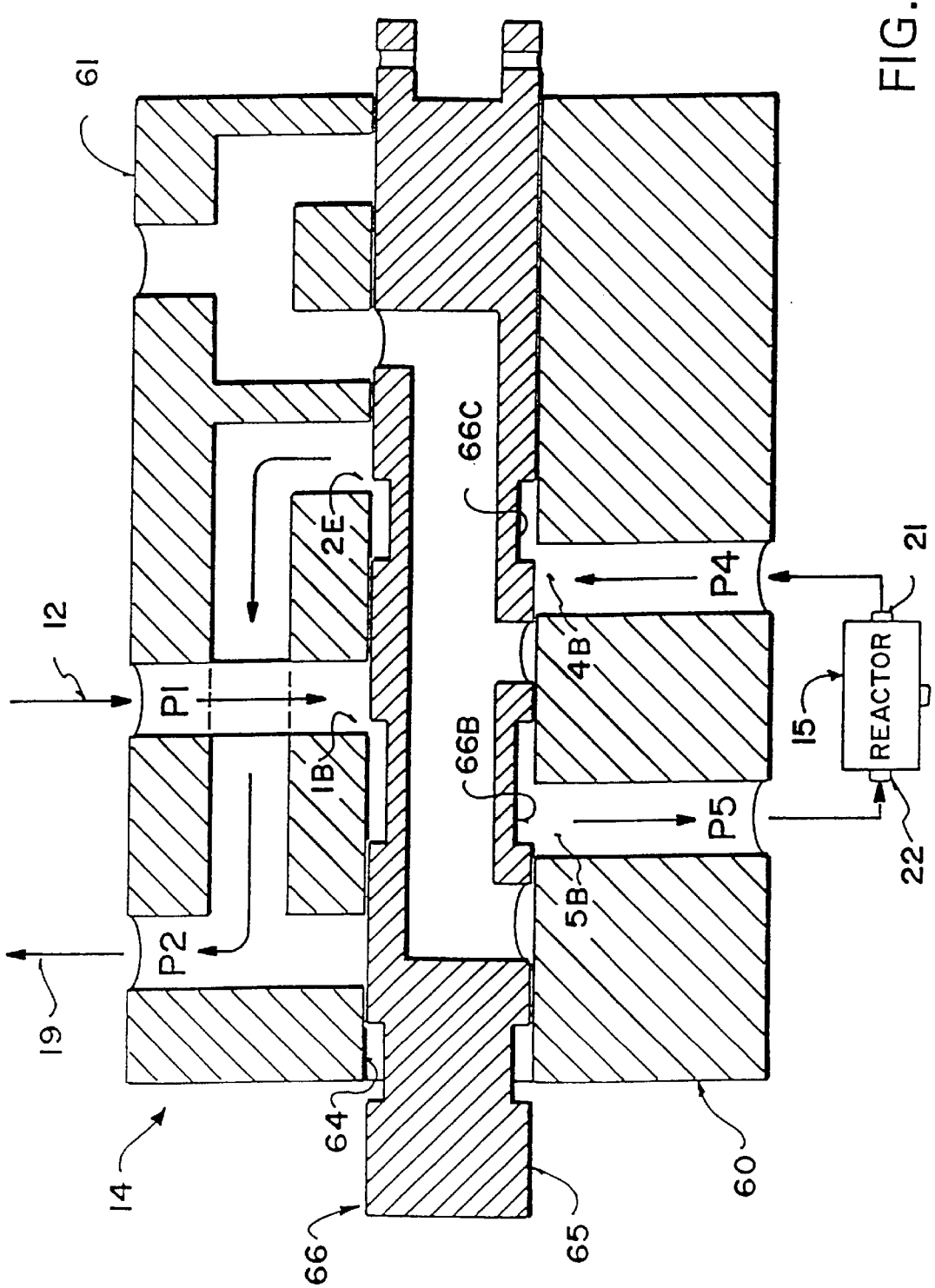
FIG. 8 is the same cross section as FIG. 1 showing the valve in a reverse flow position number 4.

In FIG. 8 is shown the reverse flow position number 4 which is effect opposite to the forward flow position number 2 of FIG. 6. Thus in this position shown in FIG. 8 which is one step beyond the position of FIG. 7, water from the inlet port 1 is communicated through the opening 1B to the recess 66B and thence to the opening 5B of the port 5. Thus the inlet water is supplied to the port 22 of the reactor. The return water from the port 21 of the reactor is communicated to the port 4. The opening 4B of the port 4 is in communication with the recess 66C of the valve member which is also partly aligned with the opening 2E of the port 2 thus causing the direction of the waste water from the port 21 of the reactor to be communicated to the port 2 and thus to the waste line 19.

It will be noted that in order for the valve to be moved from the first or forward flow position shown in FIG. 6 to the reverse flow position shown in FIG. 8 or vice versa, it is necessary for the valve to be stepped through the flush position shown in FIGS. 5 and 7. Therefore whenever the reactor is reversed in flow, it passes through a first flush in one direction and a second flush in the opposite direction to remove all contaminants from the reactor before entering the flow position in the opposed direction.

The control circuit 17 which controls operation of the actuator 16 is not shown in detail as the controls are previously known and are apparent to one skilled in the art.

In general, the control circuit operates in conjunction with the level switches 46 through 50 of the tank which include a high level switch, a high middle level switch, a low middle level switch and a low level switch. The first two switches control operation of the pump. The pump starts when the water level drops through the second switch and the pump stops when the water level reaches the first switch. The tank is of the type including a bladder and gas compartment (not shown) which maintains the tank under pressure and allows the water level to vary by compressing the gas compartment.

The central closed position is used particularly in an alarm condition which occurs whenever an excess operating pressure occurs or a low inlet water pressure occurs. In this situation the main pump is stopped and the valve is moved to the central closed position to prevent improper flow of water.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for treating water from a water supply for consumption comprising:
   a water supply inlet;
   a treatment reactor having a housing which is elongate along an axis of the reactor with a first port, a second port, and a third port in the housing, said treatment reactor being arranged for receiving water from the water supply inlet at one of the first and third ports and for separating water from the water supply inlet into a consumption output at the second port and a waste output at the other of the first and third ports;
   a pump having a pump body which is elongate along an axis of the pump for pumping water through the reactor;
   a storage tank for receiving and storing water from the consumption output;
   and a valve arrangement for controlling flow of water and waste through the reactor;
   the storage tank having a tank wall defining a tank wall contour surrounding a tank axis;
   the tank wall having at least one recess in the tank wall defined by a recess wall portion recessed from the tank wall contour toward the tank axis;
   the recess wall portion at least partly surrounding a recess axis of the recess which is parallel to the tank axis;
   the at least one recess receiving at least partly therein at least one of the body of the pump and the housing of the reactor;
   said at least one of the pump and treatment reactor therefore being separated from water stored within the storage tank by the storage tank wall.

2. The apparatus according to claim 1 wherein both the pump and the reactor are separated from water stored within the storage tank by the storage tank wall.

3. The apparatus according to claim 1 wherein the at least one recess comprises a first recess and a second recess, the recesses being angularly spaced around the tank wall contour relative to the tank axis and each having a respective axis with the axes being mutually parallel and parallel to the tank axis, the first recess receiving at least partly the body of the pump with the axis of the pump parallel to the tank axis and the second recess receiving at least partly the housing of the treatment reactor with the axis of the reactor parallel to the tank axis.

4. The apparatus according to claim 3 including a removable cover panel arranged to extend across the recesses thereby enclosing the recesses.

5. The apparatus according to claim 4 wherein the removable cover panel follows the tank wall contour.

6. The apparatus according to claim 3 wherein a wall portion joining the first and second recesses is recessed from the tank wall contour.

7. The apparatus according to claim 6 wherein the wall portion joining the first and second recesses defines an area is arranged for receiving plumbing and wiring connections to the reactor and the pump.

8. The apparatus according to claim 6 including at least one support strap for the body of the pump and the housing of the reactor, the strap being attached to the wall portion and including portions each extending outwardly to a respective side of the wall portion for engaging around the body of the pump and the housing of the reactor.

9. The apparatus according to claim 3 wherein one of the recesses is larger than the other of the recesses.

10. The apparatus according to claim 1 wherein the tank wall contour is cylindrical.

11. The apparatus according to claim 10 wherein the cylindrical tank wall contour is circular in cross-section at right angles to the tank axis.

12. The apparatus according to claim 10 wherein the pump body and the reactor housing are wholly contained within the respective recess and therefore within the tank wall contour.

13. The apparatus according to claim 1 wherein the at least one recess extends substantially continuously from the position closely adjacent one end of the tank to a position closely adjacent an opposed end of the tank.

14. The apparatus according to claim 13 wherein the tank has the axis thereof vertical such that said one end is at the top and the opposed end is at the bottom.

15. The apparatus according to claim 14 wherein recess extends to a position spaced from the top.

16. The apparatus according to claim 1 a top of the tank includes a shallow cylindrical receptacle for the valve arrangement, an electric control circuit, and an actuator for controlling the valve arrangement.

17. The apparatus according to claim 16 including a removable cover panel having a surrounding flange for engaging over the top of the tank for enclosing the receptacle.

* * * * *